United States Patent [19]
Lak

[11] Patent Number: 5,862,670
[45] Date of Patent: Jan. 26, 1999

[54] CYROGENIC UPPER STAGE FOR REUSABLE LAUNCH VEHICLE

[75] Inventor: Tibor I. Lak, Huntington Beach, Calif.

[73] Assignee: Boeing North American, Inc., Seal Beach, Calif.

[21] Appl. No.: 931,420

[22] Filed: Sep. 16, 1997

[51] Int. Cl.$^6$ .................................................. F25B 19/00
[52] U.S. Cl. ................................................ 62/7; 62/48.1
[58] Field of Search .................................. 62/7, 48.1

[56] References Cited

U.S. PATENT DOCUMENTS

| | | | |
|---|---|---|---|
| 3,040,520 | 6/1962 | Rae | 62/7 |
| 3,473,343 | 10/1969 | Chamberlain | 62/7 |
| 4,292,062 | 9/1981 | Dinulescu et al. | 62/7 |

Primary Examiner—Ronald Capossela
Attorney, Agent, or Firm—Harry B. Field; Steven E. Kahm

[57] ABSTRACT

Leakage of propellants such as oxygen and hydrogen in an enclosed environment in the atmosphere can lead to fires or explosions. For storage tanks on reusable launch vehicles such as the space shuttle where propellant is to be stored in the cargo bay of the vehicle, the storage tank should be filled while the vehicle is at a safe altitude to avoid the dangers associated with propellant leakage. The invention a process for filling propellant tanks at safe altitudes where if there is propellant leakage ignition will not occur. The process involves launching the vehicle with an inert gas in the storage tanks, dumping the inert gas and filling the tanks in the cargo bay from the main propellant tanks during the launch once the vehicle is at a safe altitude. The propellant can be dumped overboard and the storage tanks filled with an inert gas in case of a mission abort if the vehicle needs to make an emergency landing.

11 Claims, 1 Drawing Sheet

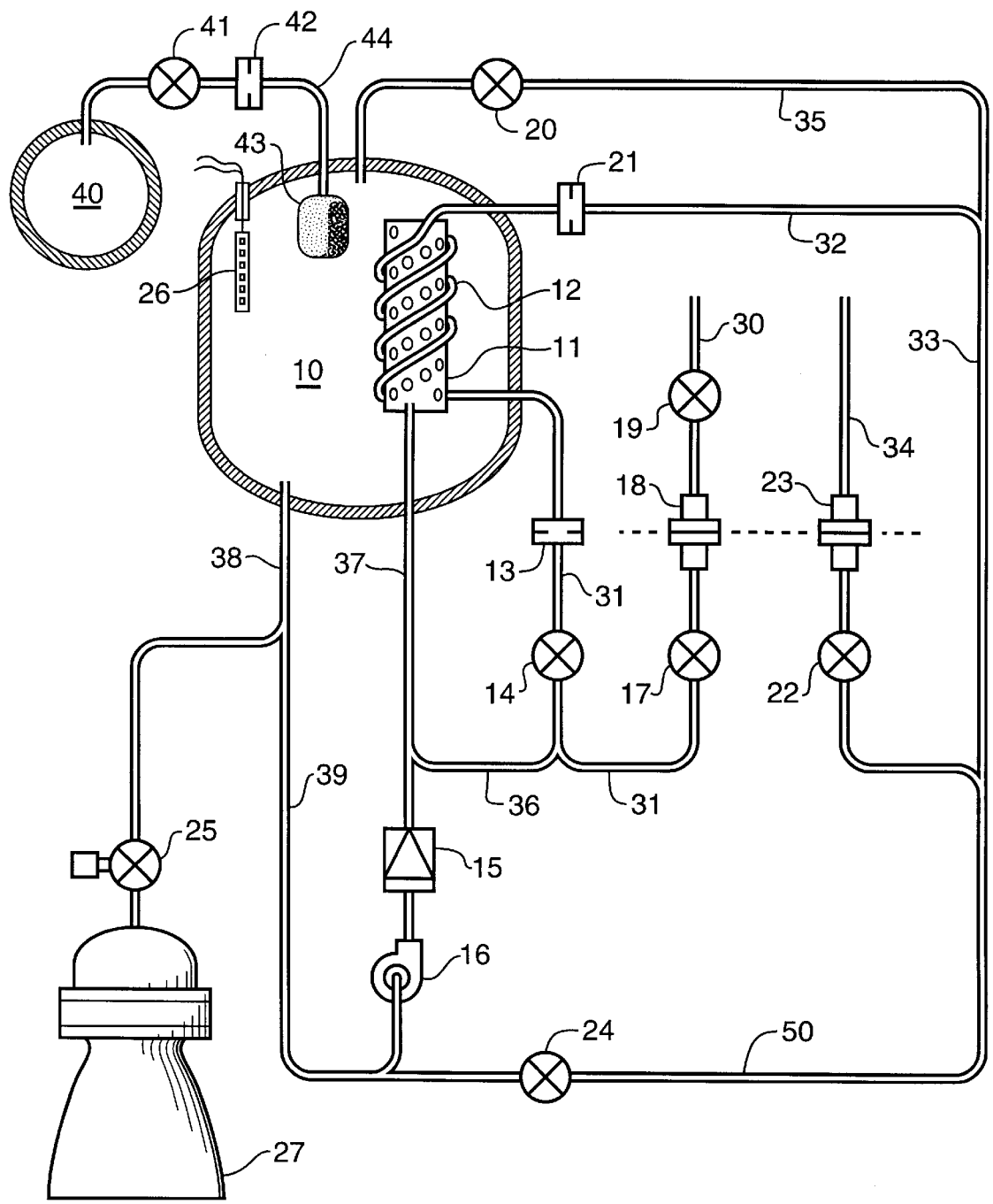

under these conditions.

CYROGENIC UPPER STAGE FOR REUSABLE LAUNCH VEHICLE

BACKGROUND OF THE INVENTION

1. Field of the Invention

This invention relates to the loading and storage of cryogenic fuel inside a vehicle, and more particularly to the transfer of cryogenic fuel from a main tank to another tank inside of the cargo bay of a vehicle during flight.

2. Description of the Related Art

Current designs for upper stage reusable launch vehicles, satellites and other uses for stored cryogenic fuel call for locating cryogenic tanks inside a closed cargo bay of a launch vehicle. A significant cryogenic liquid leakage during tank chill and fill can result in an unacceptable payload bay overpressurization resulting in a potential loss of the vehicle and the payload. Even a small component leakage in the cargo bay can represent an unacceptable risk of explosion or fire. The risk of leakage is very high during loading operations and during abort landings.

The safety and operations impact of a cryogenic upper stage for the Space Shuttle was extensively evaluated in the Shuttle/Centaur program at NASA. The program was eventually canceled because of "major unresolved safety issues." The safety issues associated with a typical cryogenic upper stage can be grouped into three main areas; loading, mission abort, and post abort landing. The loading issues included; cryogenic component leakage, cargo bay over pressurization, liquid air/nitrogen condensation on the $LH_2$ tank multi-layered insulation and potential damage to structure, premature separation of the lift-off fill and vent umbilical resulting in the inability to drain and vent the tank, and T zero umbilical/vehicle separation and clearance. The safety issues during mission abort include; the need to rapidly dump both $LO_2$ and $LH_2$ in a positive and/or zero g environment, reducing the post dump residuals to a low level prior to 160 k ft altitude, and repressurization of the storage tanks prior to landing. The post landing abort issues include; leakage of hydrogen and oxygen into the closed cargo bay without the presence of a purge gas, venting of hydrogen gas after a landing which can result in unacceptable accumulation of unburned hydrogen outside and inside the vehicle, potential detonation of the unburned hydrogen, unacceptable plume heating of the vehicle vertical tail, and safing the cryo upper stage.

The propellant dump and vacuum inerting issues can be resolved through proper tank and dump system design. However, the loading, and prelaunch issues are more difficult and can only be safely resolved if cryogens are not present. The success of a cryogenic upper stage therefore depends on the ability to safely and reliably load the tanks after lift-off.

SUMMARY OF THE INVENTION

Upper stage tanks are filled with helium at takeoff for safely. The helium is dumped and cryogenic propellants are transferred from the main propellant tanks to the upper stage tanks once the vehicle is at a safe altitude. At a high altitude if liquid hydrogen and liquid oxygen escape the low pressure of the environment is such that the propellants can not ignite or explode. In case of a mission abort the propellants are dumped from the upper stage tanks before the vehicle reaches an altitude where hydrogen and oxygen ignition can occur. Helium refills the upper stage tanks for safety during landing, and because there are no cryogens remaining there is no post landing leakage or venting hazard with oxygen or hydrogen.

Transferring propellant at a safe altitude eliminates all the ground fuel transfer safety problems associated with leaks into a closed environment.

No ground facilities are needed to load the upper stage tanks further there are no ground disconnect lines, ground fill lines, or vent lines needed when the propellants are transferred between tanks in flight. Further there are no ground support procedures to follow making loading of propellants on the vehicle easier and safer.

OBJECTS OF THE INVENTION

It is an object of the invention to improve the safety of flying hydrogen and oxygen in a closed compartment.

It is an object of the invention to lower the cost of maintenance by eliminating the ground loading facilities needed to load propellant into upper stage tanks.

It is also an object of the invention to simplify the procedures for launching a vehicle.

Other objects, advantages and novel features of the present invention will become apparent from the following detailed description of the invention when considered in conjunction with the accompanying drawing.

BRIEF DESCRIPTION OF THE DRAWINGS

The FIGURE is a schematic of the apparatus for loading and dumping of cryogenic propellant in upper stage tanks.

DETAILED DESCRIPTION OF THE PREFERRED EMBODIMENT

If propellants were in the upper stage tanks inside a closed cargo bay when the vehicle is on the ground, particularly during loading and launch, there is a risk that propellant leakage could cause fires or explosions. In the preferred embodiment of the invention, when a vehicle like the space shuttle is being loaded and launched, the upper stage tanks 10 inside of the cargo bay contain an inert gas such as helium instead of propellants to eliminate such risks. The upper stage tanks 10 are then filled with propellants from the main propellant tanks of the vehicle while the vehicle is in flight and at an altitude where propellant leaks are benign. The process of filling the tanks 10 with propellant consists of three phases. The first phase is the tank blowdown phase. In this phase the tank vent valve 20 is opened to allow the helium in tank 10 to escape through tank vent line 35. The helium then flows through vent line 33 and is vented out of the system when vent isolation valve 22 is open. The helium can also escape tank 10 when thermodynamic isolation valve 14 is open allowing the helium to escape through spray bar 11, and lines 37, 36, 31, 12, 32, 33 and 34. This allows the blowdown of the helium stored in the tank on the ground to vacuum inert the tank and blow the tank pressure down to zero atmospheric pressure.

Phase two is the chill down phase where the tank 10 is cooled down to receive cryogenic liquid propellants. Once the tank is vented it must be cooled to cryo temperatures so that it can receive cryogenic liquid oxygen or hydrogen. To do this fill valve 19 is opened allowing propellant from the vehicle main tanks (not shown) to flow through the vehicle fill line 30 to the fill and drain disconnect 18. Isolation valve 17 is opened and the propellant can flow to thermodynamic vent valve inlet line 36 and spray bar inlet line 37 to spray bar 11 for injecting the propellant into tank 10. The spray of propellant from spray bar 11 chills down the tank walls of tank 10 and the vapor from the propellant escapes tank 10 through tank vent line 35 when vent valve 20 is opened. The vapor then travels down vent line 33 and when valve 22 is opened is dumped out of the vehicle. Opening thermodynamic isolation valve 14 allows the propellant to flow past the thermodynamic vent flow orifice 13 into heat exchanger 12 thereby cooling the liquid flow passing through the spray bar 11 and the heat exchanger 12 while the tank 10 is being cooled. The warmed propellant is dumped by passing through back pressure orifice 21 in heat exchanger exit line 32, which connects to vent line 33. When the tank 10 reaches the desired cryogenic temperature the tank chill down process is completed.

The third step is the tank 10 fill. When vent valve 20 closes it stops the escape of vapor from the tank. With fill valve 19 open propellant is continuing to be sprayed into tank 10 by spray bar 11. The propellant from spray bar 11 collapses the vapor in tank 10 under positive acceleration of the vehicle, accumulating liquid propellant in tank 10. The filling process continues through the spray bar 11 until the liquid level sensor 26 indicates tank 10 is filled.

Part of the liquid propellant flow is used to subcool the liquid propellant being filled into the tank 10. Subcooling is accomplished by diverting part of the flow of liquid propellant through thermodynamic isolation valve 14, thermodynamic vent flow orifice 13 and heat exchanger 12 such that it removes heat from the spray from spray bar 11 thus subcooling and densifing the propellant in tank 10. The subcooled propellant in tank 10 therefore has an increased orbital stay time due to the increased thermal capacity of the subcooled propellant which is desirable in the cryo upper stage.

Propellant in tank 10 can be used for supplying propellant to upper stage engine 27 or used as a tanker for storage of propellant to resupply on-orbit vehicles such as a space station or other cryogenic users in space.

The tank chilling and filling transfer process is performed during vehicle acceleration at the same pressure that is required to feed the main engines accelerating the vehicle. Therefore a pump to fill the tank 10 is not required in this embodiment. However, a pump could be used to increase the flow rate and accelerate the time it takes to fill tank 10.

In the case of a mission abort where the vehicle has to land, the cryogenic propellant in tank 10 has to be dumped and tank 10 vacuum inerted before reaching an altitude here hydrogen and oxygen can ignite. To dump the propellant, dump valve 24 is opened allowing propellant to escape the tank 10 through main feed line 38 and recirculation line 39 which leads to dump line 50 and vent line 33. Propellant can also be dumped through vent valve 20, and lines 35, 33, and 34. This allows a secondary dump and vacuum inerting path to be present in case of a dump valve 24 failure. A third means of vacuum inerting the tank 10 is also provided through the thermodynamic vent valve 14. Opening valve 14 allows propellant to flow through spray bar 11, line 37, 36, and 31 followed by flow through heat exchanger 11, line 32, 33, and 34. To insure complete dumping of the propellants the booster vehicle dump system can also be used. By opening valves 17 and 19 the propellant in tank 10 can escape via line 38, 39, check valve 15, line 36, 31 and 30, after main engine shutdown and during booster vehicle feedline vacuum inerting. Since the cryo stage fill system is connected to the booster vehicle feed system, the same dump path that vacuum inerts the booster feedlines can also vacuum inert the cryo stage. This ensures that no hydrogen or oxygen is present in the cryo stage to represent a hazardous condition below about a 30,000 meter altitude.

Following vacuum inerting of the tank 10 there may be solid residual hydrogen or oxygen present in the tank. This solid hydrogen or oxygen can be sublimated by either a tank wall mounted heater or using helium to vaporize the solid hydrogen or oxygen. The helium source would be the same helium source that is used to pressurize the tank 10 for normal expulsion of the liquid from the tank. The helium pressurization system consists of a helium tank 40, a helium pressurization control valve 41, a helium flow control orifice 42 and helium pressurization line 44. The helium is injected into the tank 10 thorough tank pressurization diffuser 43. Helium is also used to pressurize tank 10 after the vacuum inerting has been performed to bring the tank 10 back up to atmospheric pressure for atmospheric reentry.

When the propellant tank is used in the second stage of a vehicle a disconnect for the fuel input and venting systems such as fill and drain disconnect 18 and vent disconnect 23 must be used to decouple the systems.

If the tank 10 is used to provide propellant to an engine 27, engine isolation valve 25 is opened and propellant flows from tank 10 to the engine 27 through main feed line 38. If tank 10 is used as tankage to supply fuel to another vehicle then engine 27 is deleted from the system.

To keep the propellant in tank 10 stirred and mixed while stored in space, recirculation pump 16 pumps propellant from tank 10 through main feed line 38 and recirculation line 39 through check valve 15 to the spray bar 11. This liquid mixing through the use of the spray system thermally de-stratifies the tank 10 and prevents tank pressure rise. Mixing the liquid and ullage spaces in the tank can be used to prevent excessive pressure rise for only a limited time. To reject heat from the tank 10 thermodynamic isolation valve 14 is opened, allowing liquid to flow through lines 36 and 31, orifice 13, heat exchanger 12, orifice 21 and lines 32, 33 and 34. This vented flow expands to a low pressure and temperature downstream of the orifice 13 and because it is at a low temperature it absorbs heat from the pump recirculation flow flowing through line 38, 39, pump 16 check valve 15, line 37 and spray bar 11.

In alternate embodiments of the invention a means of mixing and spraying liquid into the tank 10 with a showerhead, or jet nozzle may be substituted for the spray bar 11. Further, the heat exchanger 12 to subcool the liquid flow can be designed to be either inside or outside the tank 10 and may consist of different means of exchanging heat between the liquid flow and the vented flow.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of filling a cryogenic tank in a closed environment on a reusable space vehicle while in flight with an engine on, comprising:

blowing down the contents of a cryogenic tank to empty the cryogenic tank, chilling the cryogenic tank to prepare it for receiving a cryogenic propellant, filling the cryogenic tank with the cryogenic propellant from a main storage tank while the vehicle is accelerating, using the pressure which feeds the vehicle engine to load the cryogenic tank.

2. A method of filling a cryogenic tank in a closed environment on a space vehicle while in flight with an engine on, as in claim 1, comprising the additional steps of:

dumping the contents of the cryogenic tank overboard at a high altitude during a mission abort, filling the cryogenic tank with an inert gas for vehicle reentry and landing.

3. A method of filling a cryogenic tank in a closed environment on a space vehicle while in flight with an engine on, as in claim 1, comprising the additional step of:

pumping the cryogenic propellant into the cryogenic tank to increase the flow rate.

4. A method of filling a cryogenic tank in a closed environment on a space vehicle while in flight with an engine on, as in claim 1, comprising the additional step of:

stirring the cryogenic propellant in the cryogenic tank to keep the temperature evenly distributed throughout the cryogenic tank while stored.

5. A method of filling a cryogenic tank in a closed environment on a reusable space vehicle while in flight with an engine on, as in claim 1 wherein:

chilling the cryogenic tank with a spray bar having the cryogenic propellant flowing therethrough to uniformly chill the cryogenic tank.

6. A method of filling a cryogenic tank in a closed environment on a reusable space vehicle while in flight with an engine on, as in claim 1 wherein:

the cryogenic tank filling takes place at an altitude wherein a leak will not result in a catastrophic event such as ignitions, fires and explosions.

7. A method of filling a cryogenic tank in a closed environment on a reusable space vehicle while in flight with an engine on, as in claim 1, further comprising:

filling and chilling the cryogenic tank using a spray bar to uniformly chill and fill the cryogenic tank with the cryogenic propellant.

8. A method of filling a cryogenic tank in a closed environment on a reusable space vehicle while in flight with an engine on, as in claim 1, further comprising:

filling the cryogenic tank the cryogenic propellant by using an internal tank heat exchanger and a thermodynamic vent system, which increases the cryogenic propellant density and reduces the tank operating pressure and increases the cryogenic propellant storage time.

9. A method of filling a cryogenic tank in a closed environment on a reusable space vehicle while in flight with an engine on, as in claim 7, further comprising:

filling the cryogenic tank with the cryogenic propellant by using an internal tank heat exchanger and a thermodynamic vent system, which increases the cryogenic propellant density and reduces the tank operating pressure and increases the cryogenic propellant storage time.

10. A method of filling a cryogenic tank in a closed environment on a reusable space vehicle while in flight with an engine on, as in claim 1 wherein:

chilling the cryogenic tank with a shower-head having the cryogenic propellant flowing therethrough to uniformly chill the cryogenic tank.

11. A method of filling a cryogenic tank in a closed environment on a reusable space vehicle while in flight with an engine on, as in claim 1, further comprising:

filling and chilling the cryogenic tank using a spray bar to uniformly chill and fill the cryogenic tank with the cryogenic propellant.

* * * * *